United States Patent
Franceschelli, Jr. et al.

(10) Patent No.: US 7,404,145 B1
(45) Date of Patent: Jul. 22, 2008

(54) GENERIC MECHANISM FOR REPORTING ON BACKUPS

(75) Inventors: Anthony J. Franceschelli, Jr., Norton, MA (US); Jeffrey S. Phillips, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 514 days.

(21) Appl. No.: 10/109,036

(22) Filed: Mar. 28, 2002

(51) Int. Cl.
  *G06F 15/177* (2006.01)
(52) U.S. Cl. ........................................... 715/736
(58) Field of Classification Search ................ 715/762, 715/764, 763, 781, 736, 760, 734, 735
See application file for complete search history.

(56) References Cited

U.S. PATENT DOCUMENTS

| | | |
|---|---|---|
| 5,329,619 A | 7/1994 | Page et al. |
| 5,455,953 A | 10/1995 | Russell |
| 5,553,242 A | 9/1996 | Russell et al. |
| 5,761,507 A | 6/1998 | Govett |
| 5,864,669 A | 1/1999 | Osterman et al. |
| 6,067,580 A | 5/2000 | Aman et al. |
| 6,144,999 A | 11/2000 | Khalidi et al. |
| 6,163,856 A | 12/2000 | Dion et al. |
| 6,202,089 B1 | 3/2001 | Juster |
| 6,247,057 B1 | 6/2001 | Barrera, III |
| 6,377,993 B1 | 4/2002 | Brandt et al. |
| 6,453,362 B1 | 9/2002 | Bittinger et al. |
| 6,539,494 B1 | 3/2003 | Abramson et al. |
| 6,539,949 B2 | 4/2003 | Christensen |
| 6,574,661 B1 | 6/2003 | Delano et al. |
| 6,621,505 B1 * | 9/2003 | Beauchamp et al. ........ 715/764 |
| 6,631,402 B1 * | 10/2003 | Devine et al. ............... 709/217 |
| 7,043,732 B2 * | 5/2006 | Mandal et al. ............. 719/310 |
| 7,107,534 B1 * | 9/2006 | de Jong et al. ............. 715/734 |
| 2004/0073675 A1 * | 4/2004 | Honma et al. ............... 709/226 |

OTHER PUBLICATIONS

Kirch, Olaf, "NFS File Locking," published Jul. 15, 1995, 4 pages.
U.S. Appl. No. 10/109,244, filed Mar. 28, 2002, Franceschelli et al., entitled "Mechanism to Create and Launch RMI Servers For Individual Client Applications."
U.S. Appl. No. 10/109,013, filed Mar. 28, 2002, Franceschelli et al., entitled "Backup Reporting Framework Graphical User Interface."

* cited by examiner

*Primary Examiner*—Thanh T Vu
(74) *Attorney, Agent, or Firm*—Daly, Crowley, Mofford & Durkee, LLP

(57) ABSTRACT

The present invention comprises a generic mechanism for reporting on backup operations. An object is abstracted in order to provide a generic reporting object, and the generic reporting object is displayed by the reporting GUI. The GUI is thus provided for handling any object which is abstracted to the generic format. The generic format is applicable to any number of objects which would otherwise require the GUI to contain code specific for displaying the object.

42 Claims, 1 Drawing Sheet

GENERIC MECHANISM FOR REPORTING ON BACKUPS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to a mechanism for reporting on backup operations and more specifically to a mechanism for reporting on backup reporting operations using generic reporting objects presented to a graphical user interface (GUI).

BACKGROUND OF THE INVENTION

As is known in the art, computer systems that process and store large amounts of data typically include one or more processors in communication with a shared data storage system in which the data is stored. The data storage system can include one or more storage devices, such as disk drives. To minimize data loss, the computer systems can also include a backup storage system in communication with the primary processor and the data storage system.

Known backup storage systems can include a backup storage device (such as tape storage or any other storage mechanism), together with a system for placing data into the storage device and recovering the data from that storage device. To perform a backup, the host copies data from the shared storage system across the network to the backup storage system. Thus, an actual data file can be communicated over the network to the backup storage device.

The shared storage system corresponds to the actual physical storage. For the host to write the backup data over the network to the backup storage system, the host first converts the backup data into file data, i.e., the host retrieves the data from the physical storage system level, and converts the data into application level format (e.g. a file) through a logical volume manager level, a file system level and the application level. When the backup storage device receives the data file, the backup storage system can take the application level data file, and convert it to its appropriate format for the backup storage system. If the backup storage system is a tape-based device, the data is converted to a serial format of blocks or segments.

The EMC Data Manager (EDM) is capable of such backup and restore over a network, as described in numerous publications available from EMC of Hopkinton, Mass., including the EDM User Guide (Network) "Basic EDM Product Manual." An exemplary prior art backup storage architecture in which a direct connection is established between the shared storage system and the backup storage system is described in U.S. Pat. No. 6,047,294, assigned to assignee of the present invention, entitled Logical Restore from a Physical Backup in Computer Storage System, and incorporated herein by reference.

For large databases, tape-based data backup and restore systems, which are well known in the art, can be used. In general, files, databases and the like are copied to tape media at selected times. Typically, data is periodically backed up to prevent the loss of data due to software errors, human error, and hardware failures. Upon detection of an error, in an online database, for example, the backed up data can be restored to effect recovery of the data. While restore refers to obtaining backed up data, data recovery refers to the entire process in which applications can access and use the retrieved data. Transactions since the time of backup can be recreated using so-called redo logs. One disadvantage associated with the above backup reporting mechanism, is that the objects to be displayed by the reporting GUI are of various formats and the GUI needs to understand each of the various formats in order to produce a report. It would, therefore, be desirable to provide a generic mechanism for reporting on backup operations.

SUMMARY OF THE INVENTION

The present invention comprises a generic mechanism for reporting on backup operations. An object is abstracted in order to provide a generic reporting object, and the generic reporting object is displayed by the reporting GUI. The GUI is thus provided for handling any object which is abstracted to the generic format. The generic format is applicable to any number of objects which would otherwise require the GUI to contain code specific for displaying the object.

In accordance with yet another aspect of the present invention, a computer product is presented. The computer program product includes a computer useable medium having computer readable program code embodied therein with instructions for abstracting a business object in order to provide a generic reporting object, and wherein the generic reporting object is displayed by the reporting GUI.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
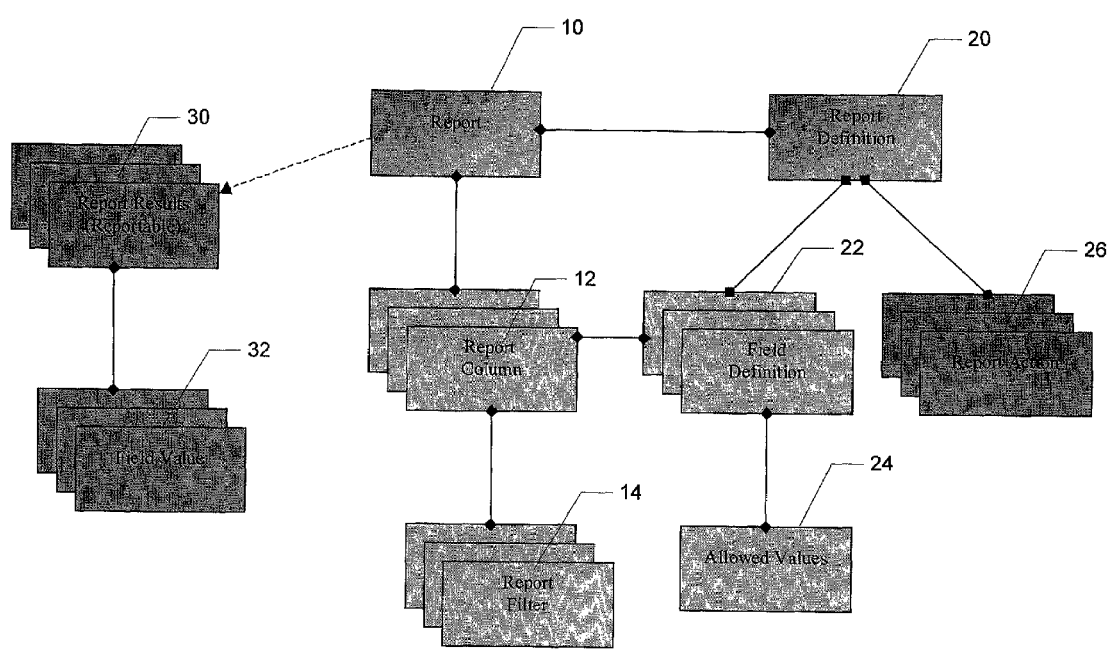
FIG. 1 is a block diagram of the generic objects of the present invention.

The present invention incorporates generic reporting objects from which specific report types can be derived. The report types include media reports, backup reports and events reports. Each of the report types have certain available columns and actions, which may be different from report type to report type, though the report types may also share certain available columns and actions. The data for the different report types comes from different sources on the backup server machine. While a Graphical User Interface (GUI) is described, a Command Line Interface (CLI) could also be used, therefore the term GUI as used herein will also include a CLI. There is specific code for each report type that is responsible for gathering this data, but since the report types follow the generic report "rules" a single piece of client side code (the GUI) can edit, view and act on any or all of the report types. Developing new report types involves writing only the server side code that defines the new report using generic reporting objects and the code that is responsible for getting the report data. The GUI is generic in the sense that it doesn't know anything about Backups, Media, or Events but it does know how to deal with reporting objects. Therefore the GUI can display Backup, Media, and Event data as long as the server side code follows the generic reporting rules.

The middleware provides the major functionality of abstracting very complicated business objects into generic GUI objects where the GUI need not understand the behavior of an object in order to display or allow users to interact with it. This methodology affords the interactive nature of the GUI to be very simple, abstract, and uniform. Once this generic formatting is defined, additional information can be reported as long as the formatting rules are followed. More importantly, the GUI doesn't have to change in order to display the new information, the user doesn't have to see anything different that they would see for a back up report, as they use all the same mechanism that is already in place. The GUI will report on it the same way that it does for anything else.

The objects generically define the behavior that a report can have this includes a list of fields it can have, which fields it does have (and how they are displayed/filtered/sorted), the actions that the user can perform on rows in the report (and conditions under which those actions apply/don't apply), whether the report is editable or not, owner, creation date, and the like. The action, column, and field classes all describe the behavior that an action, column, and field are required to have to be considered a generic report. The format is defined by a set of "rules" that all of the pieces (and the report in general) have to follow.

Referring now to FIG. 1, the report instances generic infrastructure is shown. This infrastructure includes a Report object 10. The Report object 10 is a generic object which defines an instance of a report. The Report object 10 contains an identifier that describes the Report Definition object 20 that the Report object 10 utilizes. The Report Definition object 20 describes the available fields and actions that the report can contain. The Report object 10 also contains a list of Report Columns objects 12 that describe the fields that the user has chosen to be part of the report. The Report object 10 also contains methods to read and write the report to disk, as well as methods to query report results from the application-specific reporting back-end.

The Report Column object 12 utilizes a Field Definition object 22 and a Report Filter object 14 in order to represent a column of report results. Using the generic report editor GUI, the user controls whether the column is displayed, whether the column is used as a key for sorting, and, with the aid of a Report Filter object 14, how to filter report results based on the column's data values.

The Report Filter object 14 provides a general way to specify a filter for a Report Column object 12 described above. The Report Filter object 14 contains a list of conditions that a report column's result data must meet in order to be included in the results displayed by the generic report GUI. For example, a user may only want to see backup results where the date of the backup is later than Jan. 1, 2002. The Report Filter object 14 provides the user this capability. This Report Filter object 14 is further refined into a dozen or so more specific filter sub-classes that can be re-used for common data types like dates, integers, floating point numbers, text strings, enumerations, and so forth. This object 14 is used to define a single conditional used to weed out objects from the result set of a query. A conditional specifies a field, an operation (equal to, not equal to, less than, less than or equals to, greater than, greater than or equals to), and a value to compare the field value against. The criteria is defined by a set of conditionals where each conditional specifies a field ID, a conditional operand and a value to compare the entities' corresponding field value against. The conditionals are evaluated as follows: the conditionals referencing the same field are ORed if the operands are EQUALS; otherwise the conditionals are ANDed.

FIG. 1 also shows the Defining Reports generic infrastructure. This infrastructure includes a Report Definition object 20, a Field Definition object 22, an Allowed Values object 24 and a Report Action object 26.

The Report Definition object 20 describes the category of reports (e.g. Backup, Events, and Media). The Report Definition object 20 contains the list of Field Definition objects 22 that are possible in a specific report type and the Report Action objects 26 that reports using this definition are capable of taking.

The Field Definition object 22 describes a report field to the reporting GUI. It describes whether a report containing this field in a Report Column can display, sort, or filter on this field. The generic report editor GUI code uses Field Definition objects 22 to know what the user is allowed to do when setting up report columns in a user defined report. If a field can be filtered, it contains an Allowed Values object 24 that defines the range of possible values the field can have. The object 22 defines descriptive information about a field including its to heading/label, units, allowable operations on the field (displayable, sortable, filterable) and its allowed values. This information is used to determine a table column heading or is used in user defined report definitions.

The Allowed Values object 24 describes a range of values. This object 24 has been further refined into a dozen or so more specific allowed value sub-classes that can be reused for common data types like dates, integers, floating point numbers, text strings, enumerations, and so forth. The generic report editor GUI code uses these objects to help the user define filters on reporting columns. Values is a base abstract class used to define the allowable values for a field and provide a method that determines if a value is a legal value for a field.

The Report Action object 26 provides methods that the generic report results viewer uses to take action on one or more rows of viewed data. There are "hooks" that the GUI uses to know whether or not an action is available. This object 26 contains all the information associated with different operations which can be performed on a specific report. Each report maintains a list of actions it supports. For example, MediaReport supports actions like Eject, Mount, dismount etc. This object 26 is used by the GUI to draw a menu on the Specific Report window without knowing the details about that particular operation.

A Report Results generic infrastructure is also shown in FIG. 1. The Report results infrastructure includes a Reports Results (reportable) object 30 and a Field Value object 32.

The Report Results (Reportable) object 30 defines a row of report results so the results can be displayed by a single generic GUI report viewer. This abstraction incorporates the getValueAt( ) method which separates a row of data into individual Field Values that correspond to the report's columns. A list of Reportables is returned from a call to the report's getResults( ) method. This abstraction also contains methods to compare rows of data for sorting purposes. This object defines the methods that must be provided for objects whose fields are to be displayed in the GUI.

The Field Value object 32 provides a manner of representing an individual report data cell so that any report's results can be displayed by a single generic GUI report viewer. This abstraction has methods to get the text or icon value to display in a single cell of the reporting GUI. The Field Value object 32 converts their back-end, application-specific business objects to simple text strings and icons. The abstraction also contains methods to compare itself to other Field Value objects 32 for sorting purposes. This object has been further refined into a dozen or so more specific Field Value sub-classes that can be re-used for common data types like dates, integers, floating point numbers, text strings, enumerations, and so forth.

Objects are returned by the "getValueAt" method of classes implementing the reportable interface. This object provides methods to return the string and icon representation (if applicable) of the value. In addition it implements the comparable interface to provide the "compareTo" method which compares the value of this object to the value of another instance of this same field. To be referenced in the class, the object storing the value must implement the "toString" and "toIcon" methods.

The objects explained above describe generic behavior. Individual report types create subclasses from these objects, adding back-end, application-specific data and behavior to them. The GUI only knows about the generic objects, not the business objects. The objects passed to/from the GUI are kept at a high level and are self-describing. The GUI can simply get an object and graphically display it without knowing the object type or the details of the individual object itself.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A computer program product comprising a computer readable memory device having computer readable code thereon for providing data to a user through a generic Graphical User Interface (GUI), including program code comprising:
   instructions for selecting a complex object from a backup storage system, wherein the backup storage system comprises at least one backup storage device;
   instructions for abstracting the complex object to produce a generic report object;
   instructions for providing a method usable by the generic report object to determine whether an action is available for viewed data and, if the action is available, a method usable by a generic GUI report viewer to take the action on the viewed data, the action comprising querying results from a backup storage server;
   wherein the backup storage server is in operable communications with the at least one backup storage device;
   instructions for providing a method usable by the generic report object to maintain a list of actions that it supports for taking action on the viewed data, wherein the actions on the list include at least one of ejecting the backup storage device, mounting the backup storage device, and dismounting the backup storage device; and
   instructions for displaying the generic report object through a generic GUI, wherein the generic GUI displays the generic report object and permits interaction with the generic report object, wherein the generic GUI does not have to change to display and permit interaction with the generic report object;
   wherein the generic report object provides information about backup operations.

2. The computer program product of claim 1 further comprising instructions permitting client interaction with the generic report object through the generic GUI.

3. The computer program product of claim 1 further comprising instructions wherein the displaying comprises displaying the generic report object through a generic reporting GUI.

4. The computer program product of claim 1 further comprising instructions wherein the abstracting further comprises producing a report definition object, a report columns object and a report results object.

5. The computer program product of claim 4 further comprising instructions wherein the report definition object describes available fields and actions.

6. The computer program product of claim 4 further comprising instructions wherein the report columns object describes fields chosen by a user to be part of a report.

7. The computer program product of claim 4 further comprising instructions wherein the abstracting further comprises providing a plurality of methods including at least one of a read report method, a write report method, and a query report results method.

8. The computer program product of claim 4 further comprising instructions wherein the report columns object utilizes a field definition object and a report filter object to represent a column of report results.

9. The computer program product of claim 8 further comprising instructions wherein the report filter object includes a list of conditions that a report columns result data must meet to be included in results displayed by the generic GUI.

10. The computer program product of claim 4 further comprising instructions wherein the report definition object includes a list of field definition objects and the report actions object.

11. The computer program product of claim 10 further comprising instructions wherein each field definition object describes a report field to the generic GUI.

12. The computer program product of claim 11 further comprising instructions wherein the report field describes actions which can be performed on a field, the actions including at least one of displaying, sorting and filtering.

13. The computer program product of claim 12 further comprising instructions wherein when a field can be filtered, an allowed values object defines a range of possible values that the field can have.

14. The computer program product of claim 10 further comprising instructions wherein the report action object provides methods that the generic GUI report viewer uses to take action on one or more rows of viewed data.

15. The computer program product of claim 4 further comprising instructions wherein producing a reports results object includes providing a method which separates a row of data into one or more field values that correspond to reports columns.

16. The computer program product of claim 15 further comprising instructions wherein the field values provide a manner of representing a report data cell so that a report result is displayable by the generic GUI.

17. The computer program product of claim 15 further comprising instructions wherein the field values provide methods to compare itself to other field value objects.

18. The computer program product of claim 15 further comprising instructions wherein the methods return a representation of a value, the representation selected from a string representation and an icon representation.

19. The computer program product of claim 4 further comprising instructions providing methods to compare rows of data.

20. The computer program product of claim 1, wherein the information about backup operations comprises at least one set of data selected from the group consisting of media data, backup data, and event data.

21. The computer program product of claim 1, wherein the generic GUI does not have to change to display the results queried from the backup storage server.

22. A method for providing data to a user through a generic Graphical User Interface (GUI), the method comprising:
   selecting a complex object from a backup storage system, wherein the backup storage system comprises at least one backup storage device;
   abstracting the complex object to produce a generic report object;
   providing a method usable by the generic report object to determine whether an action is available for viewed data and, if the action is available, at least one method usable by a generic GUI report viewer to take the action on the viewed data, the action comprising querying results from a backup storage server, wherein the backup storage server is in operable communications with the at least one backup storage device;
   providing a method usable by the generic report object to maintain a list of actions that it supports for taking action on the viewed data, wherein the actions on the list include at least one of ejecting the backup storage device, mounting the backup storage device and dismounting the backup storage device;
   providing, in the generic report object, information about backup operations; and
   displaying the generic report object through a generic GUI;
   wherein the generic GUI displays the generic report object and permits interaction with the generic report object and wherein the generic GUI does not have to change to display and permit interaction with the generic report object.

23. The method of claim 22 further comprising permitting client interaction with the generic report object through the generic GUI.

24. The method of claim 22 wherein the displaying comprises displaying the generic report object through a generic reporting GUI.

25. The method of claim 22 wherein the abstracting further comprises producing a report definition object, a report columns object and a report results object.

26. The method of claim 25 wherein the report definition object describes available fields and actions.

27. The method of claim 25 wherein the report columns object describes fields chosen by a user to be part of a report.

28. The method of claim 25 wherein the abstracting further comprises providing a plurality of methods including at least one of a read report method, a write report method, and a query report results method.

29. The method of claim 25 wherein the report columns object utilizes a field definition object and a report filter object to represent a column of report results.

30. The method of claim 29 wherein the report filter object includes a list of conditions that a report columns result data must meet to be included in results displayed by the generic GUI.

31. The method of claim 25 wherein the report definition object includes a list of field definition objects and a report actions object.

32. The method of claim 31 wherein each field definition object describes a report field to the generic GUI.

33. The method of claim 32 wherein the report field describes actions which can be performed on a field, the actions including at least one of displaying, sorting and filtering.

34. The method of claim 33 wherein when a field can be filtered, an allowed values object defines a range of possible values that the field can have.

35. The method of claim 31 wherein the report action object provides methods that the generic GUI report viewer uses to take action on one or more rows of viewed data.

36. The method of claim 25 wherein producing a reports results object includes providing a method which separates a row of data into one or more Field Values that correspond to reports columns.

37. The method of claim 36 wherein the field values provide a manner of representing a report data cell so that a report result is displayable by the generic GUI.

38. The method of claim 36 wherein the field values provide methods to compare itself to other field value objects.

39. The method of claim 36 wherein the methods return a representation of a value, the representation selected from a string representation and an icon representation.

40. The method of claim 25 further comprising providing methods to compare rows of data.

41. The method of claim 22, further comprising providing, in the generic report object, at least one set of data selected from the group consisting of media data, backup data, and event data.

42. The method of claim 22, wherein the generic GUI does not have to change to display the results queried from the backup storage server.

* * * * *

UNITED STATES PATENT AND TRADEMARK OFFICE
CERTIFICATE OF CORRECTION

| | | |
|---|---|---|
| PATENT NO. | : 7,404,145 B1 | Page 1 of 1 |
| APPLICATION NO. | : 10/109036 | |
| DATED | : July 22, 2008 | |
| INVENTOR(S) | : Franceschelli, Jr. et al. | |

It is certified that error appears in the above-identified patent and that said Letters Patent is hereby corrected as shown below:

Col. 1, line 60, delete "to assignee" and replace with -- to the assignee --.

Col. 1, line 61-62, delete "entitled Logical Restore from a Physical Backup in Computer Storage System," and replace with -- entitled "Logical Restore from a Physical Backup in Computer Storage System", --.

Col. 3, line 13, delete "have this" and replace with -- have - this --.

Col. 3, line 57, delete "equals" and replace with -- equal --.

Col. 3, line 58, delete "equals" and replace with -- equal --.

Col. 4, line 18, delete "its to" and replace with -- its --.

Col. 4, line 39, delete ", dismount" and replace with -- , Dismount --.

Col. 4, line 44, delete "results" and replace with -- Results --.

Col. 4, line 45, delete "(reportable)" and replace with -- (Reportable) --.

Col. 5, line 31, delete "that that" and replace with -- that --.

Signed and Sealed this

Sixteenth Day of December, 2008

JON W. DUDAS
*Director of the United States Patent and Trademark Office*